United States Patent [19]

Vanderpool et al.

[11] 4,432,950

[45] Feb. 21, 1984

[54] RECOVERY OF REFRACTORY METAL VALUES FROM SCRAP CEMENTED CARBIDE

[75] Inventors: Clarence D. Vanderpool; Richard A. Scheithauer; Richard G. Warmington, all of Towanda, Pa.

[73] Assignee: GTE Products Corporation, Stamford, Conn.

[21] Appl. No.: 419,094

[22] Filed: Sep. 16, 1982

[51] Int. Cl.³ ............................................. C01G 41/00
[52] U.S. Cl. ...................................... 423/61; 423/53; 423/132
[58] Field of Search ...................... 423/53, 55, 61, 132

[56] References Cited

U.S. PATENT DOCUMENTS

| 3,887,680 | 6/1975 | MacInnis et al. | 423/58 |
| 4,256,708 | 3/1981 | Quartrini | 423/53 |
| 4,348,231 | 9/1982 | Ritsko et al. | 423/53 |

*Primary Examiner*—Herbert T. Carter
*Attorney, Agent, or Firm*—Robert E. Walter

[57] ABSTRACT

In a process for recovering refractory metal values from a refractory metal carbide cemented with a metal binder. The coated cemented carbide is treated with sulfuric acid to deteriorate the coating.

1 Claim, No Drawings

RECOVERY OF REFRACTORY METAL VALUES FROM SCRAP CEMENTED CARBIDE

BACKGROUND OF THE INVENTION

This invention relates to the recovery of tungsten values from scrap cemented tungsten carbide.

Recovery of tunsten values from scrap tungsten carbide has been a problem in the carbide industry for a number of years. Cemented carbide tools are made by consolidating extremely hard and fine metal carbide particles together with a suitable binder or cement. Typically, such tools contain tungsten carbide cemented with cobalt although additional carbides such as the carbides of titanium, vanadium, chromium or molybdenum may also be present.

Cobalt is the most widely used cementing material although other cementing materials such as iron, nickel, chromium or molybdenum may be employed. Since all of the materials used in the cemented carbides are extremely valuable, it is desirable to reclaim the materials found therein.

Various processes have been used in the past with varying degrees of success. U.S. Pat. No. 3,953,194 to Hartline et al describes a process for reclaiming cemented metal carbide material by subjecting the metal carbide material to catastrophic oxidation to produce a mixture of metal oxide and the oxide of the cement. The resulting oxide is reduced and finally carbonized.

Another process described in U.S. Pat. No. 3,887,680 to MacInnis, Vanderpool and Boyer wherein tungsten carbide containing an iron group metal such as cobalt is oxidized from a friable oxidation product. The oxidation product is then ground and treated by digesting it in an aqueous solution of alkali metal hydroxide under controlled conditions to recover tungsten values.

Refractory carbides are a mixture of from 4-20% Co, which acts as a binder, with 96-80% carbide. Additives, such as MoC, Vc, TiC, TaC, and NbC may be added to impart certain advantages to the carbide. To recover the valued metals from these carbides, they are oxidized in air or oxygen. The oxidation removes the carbon leaving the W, Ti, Mo, etc. as oxides; which can be further processed to recover the valued metals.

These regular carbides, however, sometimes fail during use because of poor oxidation resistance. The cutting edges become hot and oxidize and therefore become dull. To overcome this, the carbide industry has coated the base carbides with coatings which import more oxidation resistance to these pieces. These coatings are $Al_2O_3$, TiC and TiN or mixtures of these. They are also putting on multiple coatings such as an inner layer of TiC, followed by a second layer of $Al_2O_3$, then a final outside layer of TiN. When these carbides are fed through the regular air oxidation recovery processes, the TiN and TiC will oxidize if they are not covered with the $Al_2O_3$ type coating. However, the $Al_2O_3$ type coating is virtually unaffected.

SUMMARY OF THE INVENTION

In accordance with the present invention, there is provided a process for the recovery of refractory metal values from a coated refractory carbide cemented with a metal binder by treating the coated cemented carbide with sulfuric acid at a sufficient concentration for a suitable period of time to substantially deteriorate the coating and separate the refractory metal values from the metal binder values.

The present invention is suited for oxidizing carbides which have been treated for oxidation resistance and more specifically it deals with the removal of oxidation resistance coatings from carbide which makes recovery of the W values impractical. Still more specifically, it deals with removing the TiN, TiC or $Al_2O_3$ type coatings from carbide in multiple layers.

The primary general objective of this invention is to provide a fast practical method for removing the coat or coatings from oxidation resistance carbide.

DETAILED DESCRIPTION

In accordance with the present invention, coated scrap as herein before described is treated with sulfuric acid to deteriorate the coating. The sulfuric acid is preferably in concentrated aqueous solution having a concentration of greater than about 70 percent by weight. It is also contemplated that other forms of sulfuric acid may be used such as fuming sulfuric acid. When concentrated aqueous solution of sulfuric acid is utilized, the acid is preferably heated to a temperature of about 160° to about 330° Centigrade. Typical time required for deteriorating an aluminum oxide coating is from 5 to 420 hours depending on the concentration of acid and temperature. The time will vary depending on the thickness of the coating.

The resulting cemented carbide having a deteriorated coating may be oxidized according to the basic process as described in U.S. Pat. No. 3,887,680 to MacInnis et al.

According to the processes described in the above patent, scrap tungsten carbide is oxidized in air at a temperature preferably from about 825° C. to about 850° C. although higher temperatures and lower temperatures can be used, the oxidation rate is slowed at temperatures below 825° C.

The time period of oxidation depends on the size of the particles being oxidized, but generally for particles having a cross section of from about 0.25 to about 0.5 inch, it is necessary to employ oxidation times in excess of 30 hours to obtain substantially complete oxidation of the material.

According to the process of the above patent the oxidized cemented tungsten carbide product mushrooms and forms friable product which can be easily ground to powder form. The powder is charged to an aqueous solution of an alkali metal hydroxide and is heated under pressure for a number of hours. The iron group metal tungstate that is formed is converted to a water soluble alkali metal tungstate and the iron group metal is in insoluble form thereby allowing a separation of the tungsten values from the iron group of metals. The term iron group metals is used herein refers to the binder material which is most commonly cobalt although other metals as hereinbefore mentioned can be utilized.

Although any alkali metal hydroxide can be used according to the above process, sodium hydroxide is preferred because of it availability and cost. An aqueous solution containing from about 20 to about 50 percent sodium hydroxide is further preferred. After the oxidized material is ground to a powder, it is charged to the alkali metal hydroxide at a temperature of at least about 20° C. At least the stoichiometric amount of the alkali metal hydroxide must be present to enable an alkali metal tungstate to be formed. An excess of about 50 percent of theory is preferred to ensure that all of the tungsten values are converted to a soluble tungsten form. The pressure used during digestion is generally from about 50 to 200 psig. The temperature used during digestion is generally from about 140° C. to 195° C. About 6 to 10 hours is required to convert the tungsten to a water soluble form at the foregoing temperatures and pressures. Higher pressures and higher temperatures tend to promote and shorten the time required, however, use of temperatures above 170° C. and pressures above 115 lb/in$^{-2}$ do not appreciably effect the rate of reaction. Since it is more costly to use higher temperatures and pressures, the before recited temperatures are generally not exceeded.

In accordance with the above process, it has been found that substantially long oxidation times, greater than 30 hours and up to 50 hours, are needed to bring yields of tungsten values in the filtrate up to about 99 percent based on the tungsten present in the initial cemented tungsten carbide. It has been observed that long oxidation times result in the formation of an insoluble residue which is difficult to digest with the alkali metal hydroxide solution. It is believed that the undesirable portion of the residue which is difficult to digest is a complex cobalt tungstate.

EXAMPLE 1

A sample of $Al_2O_3$ coated carbide about $1\ cm \times 1\ cm \times 5\ mm$ was placed in 50 cc of concentrated $H_2SO_4$ and heated to 160° C. overnight, approximately 16 hours. After the digestion, the piece was removed from the acid and washed in cold $H_2O$. The coating was soft and could be rubbed off. A solution of 70% $H_2SO_4$ at 130° centigrade required about 2.5 weeks to remove a $Al_2O_3$ on a cemented carbide.

EXAMPLE 2

Two pieces of TiN coated carbide and one piece of $Al_2O_3$ coated carbide were placed in concentrated $H_2SO_4$. The acid was heated to 170° C. One of the TiN coated pieces started changing as soon as the temperature reached 170° C. The other required 1.5 hours before any change occurred. A white deposit of material appeared on the $Al_2O_3$ coated piece. To determine if the coating was removed, the pieces were fired in air at 950° C. for four hours. They all oxidized.

EXAMPLE 3

Four pieces of $Al_2O_3$ coated carbide were heated in 25 cc of concentrated $H_2SO_4$ at 190° C. After five hours there, a white precipitate appeared in the $H_2SO_4$. Scanning electron micrograph photos showed that the pieces were all covered with aluminum sulfate crystals. After washing in boiling water to remove the crystals, the samples were oxidized according to the process of U.S. Pat. No. 3,887,680 for different time periods. After 5 hours, one sample was only partly oxidized. After 10 hours another was fully oxidized, and the remaining samples were all fully oxidized at times greater than 15 hours.

We claim:

1. A process for recovering refractory metal values from a tungsten carbide body cemented with a metal binder wherein said body has an aluminum oxide coating, said process comprising treating said aluminum oxide coated cemented tungsten carbide body with sulfuric acid selected from the group consisting of an aqueous solution wherein said sulfuric acid is at a concentration greater than about 70 percent by weight in an aqueous solution and fuming sulfuric acid, said sulfuric acid being at a temperature of from about 130 to about 330 degrees centigrade, said treating being for a suitable period of time to form aluminum sulfate and a resulting deteriorated coating; oxidizing said cemented carbide body having a deteriorated coating in an oxygen containing atmosphere to form an oxidized product, digesting said oxidized product in an aqueous solution of sodium hydroxide to form an aqueous solution of soluble tungsten and a sludge containing metal binder values, and separating said sludge from said aqueous solution.

* * * * *

UNITED STATES PATENT AND TRADEMARK OFFICE
CERTIFICATE OF CORRECTION

PATENT NO. : 4,432,950
DATED : February 21, 1984
INVENTOR(S) : Clarence D. Vanderpool; Richard A. Scheithauer; Richard G. Warmington It is certified that error appears in the above—identified patent and that said Letters Patent is hereby corrected as shown below:

On the title page (face of the patent), the name of the third inventor, Richard G. Warmington, should be changed to read as follows:

--Richard G.W. Gingerich--.

Signed and Sealed this

Seventh Day of April, 1992

Attest:

HARRY F. MANBECK, JR.

Attesting Officer     Commissioner of Patents and Trademarks